(12) United States Patent
Shibata et al.

(10) Patent No.: US 7,236,522 B2
(45) Date of Patent: Jun. 26, 2007

(54) SURVEILLANCE SYSTEM AND IMAGE SIGNAL PROCESSING APPARATUS

(75) Inventors: Akira Shibata, Kanagawa (JP); Wataru Nakaya, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 656 days.

(21) Appl. No.: 10/403,712

(22) Filed: Mar. 31, 2003

(65) Prior Publication Data

US 2003/0202578 A1    Oct. 30, 2003

(30) Foreign Application Priority Data

Apr. 4, 2002    (JP)    ............................. 2002-102522

(51) Int. Cl.
  *H04N 7/12*    (2006.01)
  *H04B 1/66*    (2006.01)
(52) U.S. Cl. .................................................. 375/240.1
(58) Field of Classification Search ..................... None
  See application file for complete search history.

(56) References Cited

U.S. PATENT DOCUMENTS

| | | | | |
|---|---|---|---|---|
| 5,557,332 A | * | 9/1996 | Koyanagi et al. ...... | 375/240.16 |
| 5,793,658 A | * | 8/1998 | Adiletta ....................... | 708/402 |
| 5,923,339 A | * | 7/1999 | Date et al. ................... | 345/505 |
| 6,476,858 B1 | * | 11/2002 | Ramirez Diaz et al. .... | 348/159 |
| 6,697,103 B1 | * | 2/2004 | Fernandez et al. .......... | 348/143 |
| 7,015,806 B2 | * | 3/2006 | Naidoo et al. .............. | 340/531 |

FOREIGN PATENT DOCUMENTS

| | | |
|---|---|---|
| EP | 1 081 952 A2 | 10/1981 |
| EP | 1 087 620 A2 | 3/2001 |
| EP | 1 150 510 A2 | 3/2001 |
| JP | 2000-201323 A | 7/2000 |
| JP | 2001-268555 A | 9/2001 |

\* cited by examiner

*Primary Examiner*—Nhon Diep
(74) *Attorney, Agent, or Firm*—Pearne & Gordon LLP (57) ABSTRACT

Herein disclosed is a surveillance system, comprises: a plurality of imaging units for respectively taking images of specific objects to transform the images into image signals; a plurality of terminal units for respectively displaying thereon the images and producing command signals each indicative of requiring one of the images to be taken by imaging units; an image signal processing apparatus for processing the image signals transformed by the imaging units and operating the terminal units to have the terminal units display the images from the imaging units with the command signals respectively produced by the terminal units; and the image signal processing apparatus including image signal selecting means for selecting one of the image signals from among the image signals respectively transformed by the imaging units; controlling means for controlling the image signal selecting means to allow the image signals to be sequentially selected by the image signal selecting means; image signal encoding means for encoding the image signals sequentially selected by the image signal selecting means to image data; image data compressing means for compressing the image data encoded by the image signal encoding means into compression data; compression data storing means for storing therein the compression data compressed by the image data compressing means; and transmitting means for transmitting to the terminal units the compression data stored by the compression data storing means with the command signals respectively produced by the terminal units.

4 Claims, 6 Drawing Sheets

SURVEILLANCE SYSTEM AND IMAGE SIGNAL PROCESSING APPARATUS

BACKGROUND OF THE INVENTION

1. Technical Field of the Invention

The present invention relates to a surveillance system, and more particularly to a surveillance system comprising a plurality of imaging units for respectively taking images of specific images and a plurality of terminal units for respectively displaying thereon the images to be taken by the imaging units to ensure that the specific objects are respectively surveilled through the images respectively displayed by the terminal units.

2. Description of the Related Art

Figure 5:
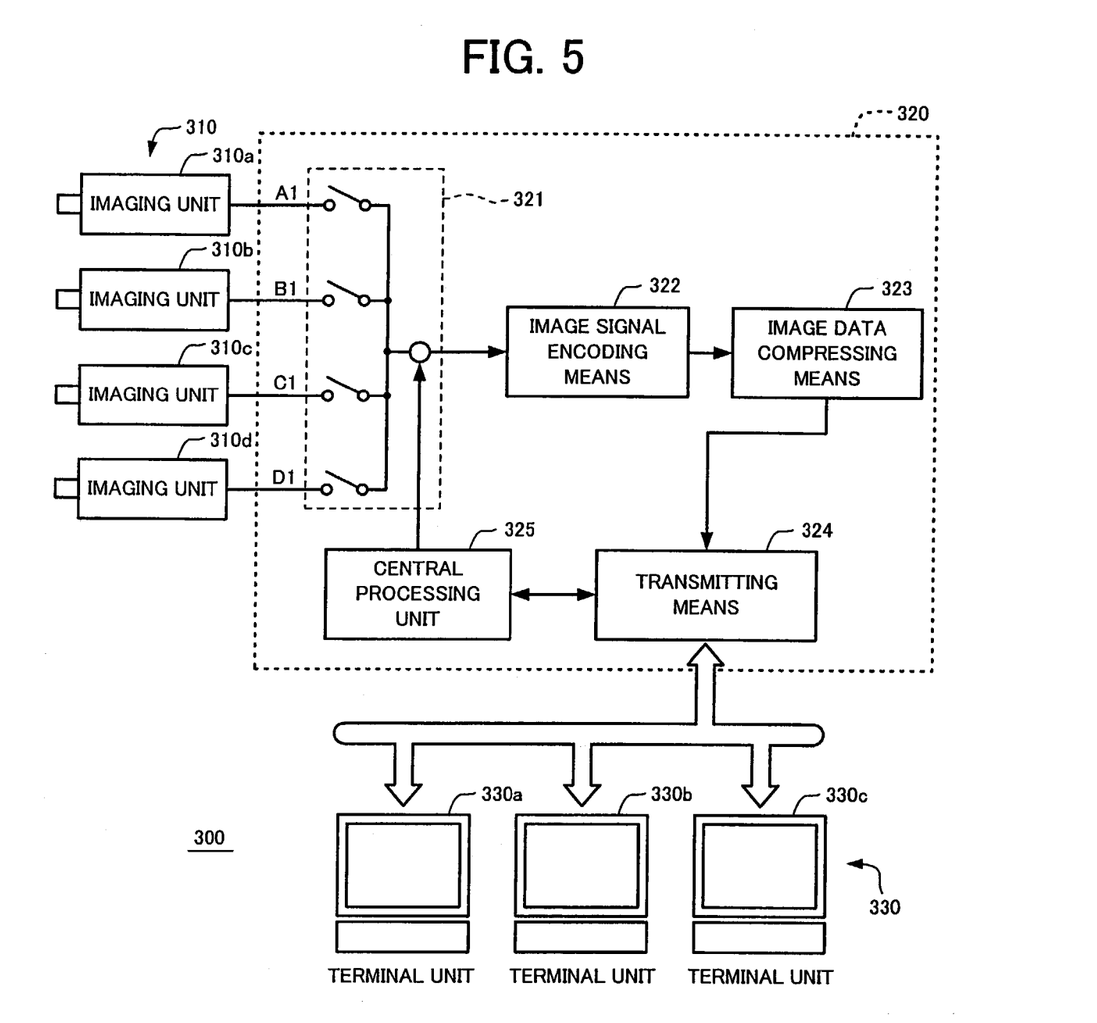
FIG. 5 is a block diagram of the conventional surveillance system.
Figure 6:
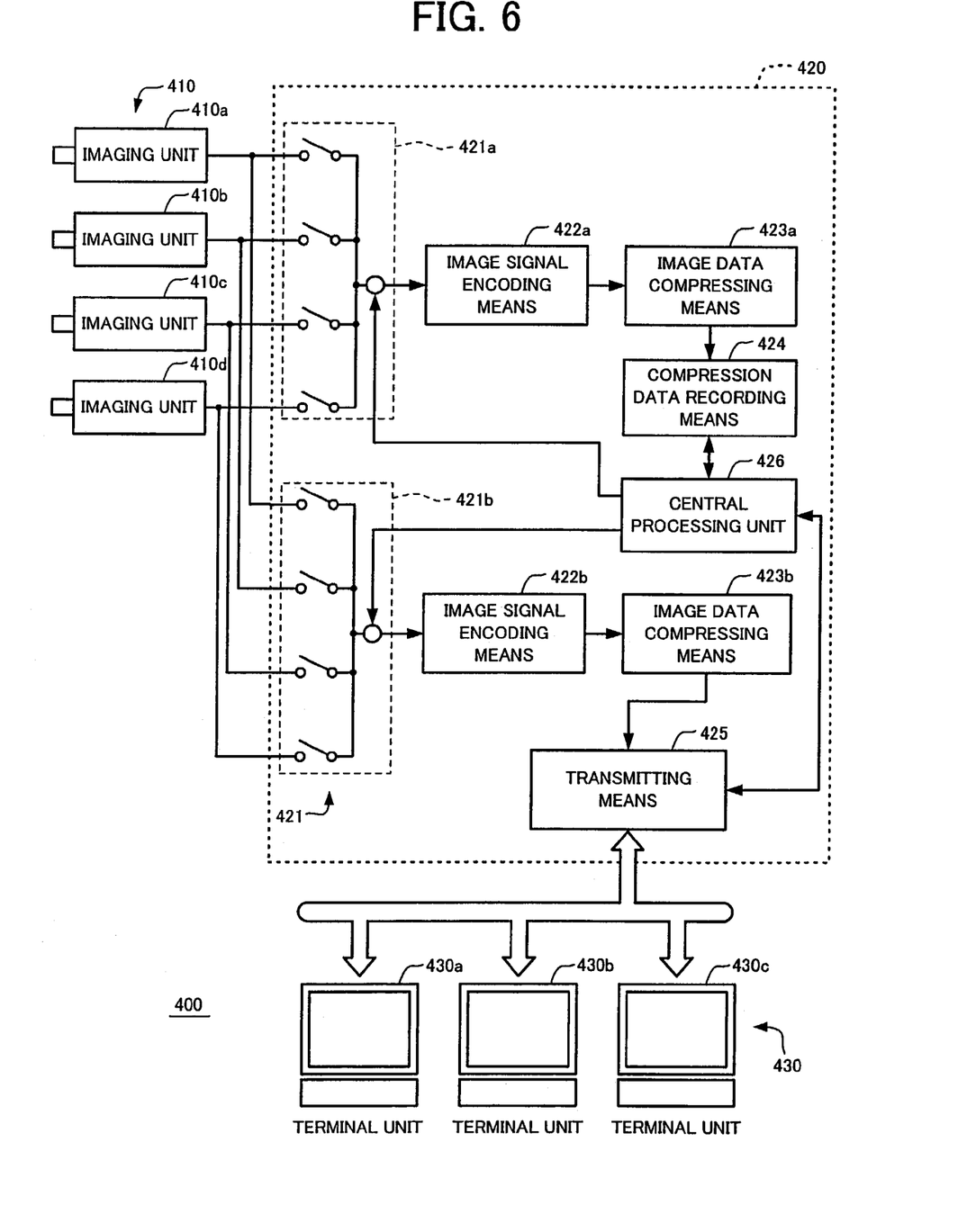
FIG. 6 is a block diagram of the conventional surveillance system.

Up until now, there have been proposed a wide variety of surveillance system of this type two typical examples of which are shown in FIGS. 5 and 6.

The first typical example of the conventional surveillance system 300 is shown in FIG. 5 as comprising a plurality of imaging units 310a to 310d for respectively taking images of specific objects to transform the images into image signals, an image signal processing unit 320 for processing the image signals transformed by the imaging units 310a to 310d, and a plurality of terminal units 330a to 330c for respectively displaying the images thereon.

The image signal processing unit 320 includes image signal selecting means 321 for selecting one of the image signals from among the image signals respectively transformed by the imaging units 310a to 310d, image signal encoding means 322 for encoding the image signal selected by the image signal selecting means 321 to an image data, image data compressing means 323 for compressing the image data encoded by the image signal encoding means 322 into a compression data; transmitting means 324 for transmitting the compression data compressed by the image data compressing means 323 to the terminal units 330a to 330c through a network, a central processing unit 325 for controlling the image signal selecting means 321 and the transmitting means 324 to allow each of the terminal units 330a to 330c to receive the compression data.

In the operation of the first typical example of the conventional surveillance system 300, the image signal selected by the image signal selecting means 321 is firstly encoded to the image data by the image signal encoding means 322. The image data encoded by the image signal encoding means 322 is then compressed into the compression data by the image data compressing means 323. The compression data compressed by the image data compressing means 323 is then transmitted by the transmitting means 324 to each of the terminal units 330a to 330c.

The first typical example of the conventional surveillance system 300 thus constructed as previously mentioned, however, encounters such a problem that the terminal units 330a to 330c cannot simultaneously require two or more different images from among the images taken by the imaging units 310a to 310d, and cannot simultaneously display on thereon the two or more different images by reason that the image signal processing unit 320 is operative to transmit to each of the terminal units 330a to 330c the compression data in association with one of the image to be taken by the imaging units 310a to 310d.

The second typical example of the conventional surveillance system is shown in FIG. 6 as comprising a plurality of imaging units 410a to 410d for respectively taking images of specific objects to transform the images into image signals, an image signal processing unit 420 for processing the image signals transformed by the imaging units 410a to 410d, and a plurality of terminal units 430a to 430c for respectively displaying the images thereon.

The image signal processing unit 420 includes first image signal selecting means 421a for selecting one of the image signals from among the image signals respectively transformed by the imaging units 410a to 410d, second image signal selecting means 421b for selecting one of the image signals from among the image signals respectively transformed by the imaging units 410a to 410d, first image signal encoding means 422a for encoding the image signal selected by the first image signal selecting means 421a to an image data, second image signal encoding means 422b for encoding the image signal selected by the second image signal selecting means 421b to an image data, first image data compressing means 423a for compressing the image data encoded by the first image signal encoding means 422a into a compression data, second image data compressing means 423b for compressing the image data encoded by the second image signal encoding means 422b into a compression data, compression data recording means 424 for recording the compression data compressed by the first image data compressing means 423a and the compression data compressed by the second image data compressing means 423b, transmitting means 425 for transmitting the compression data to the terminal units 430a to 430c through a network, and a central processing unit 426 for controlling each of the first image signal selecting means 421a, the second image signal selecting means 421b, compression data recording means 424, and the transmitting means 425.

In the operation of the second typical example of the conventional surveillance system 400, the first image signal encoding means 422a is firstly operated to encode the image signal selected by the first image signal selecting means 421a to the image data. The image data encoded by the first image signal encoding means 422a is then compressed into the compression data by the first image data compressing means 423a. The compression data compressed by the first image data compressing means 423a is then recorded by the compression data recording means 424. The image signal selected by the second image signal selecting means 421b is, on the other hand, encoded to the image data by the second image signal encoding means 422b. The image data encoded by the second image signal encoding means 422b is then compressed into the compression data by the second image data compressing means 423b. The compression data compressed by the second image data compressing means 423b is then transmitted by the transmitting means 425 to the terminal units 430a to 430c through the network.

The second typical example of the conventional surveillance system 400 thus constructed as previously mentioned, however, encounters such a problem that the conventional surveillance system 400 is complicated in assembly and thus expensive in production cost, resulting from the fact that the image signal processing unit 420 includes two image signal encoding means and two image data compressing means to have the compression data recording means 424 record the compression data, and to have transmitting means 324 transmit the compression data to the terminal units 430a to 430c.

SUMMARY OF THE INVENTION

It is, therefore, an object of the present invention to provide a surveillance system which can enhance the quality of the surveillance with respect to the specific objects to be taken by the imaging units by simultaneously monitoring two or more different specific objects by an operator or operators through the images of the specific objects respectively displayed on the monitors without being complicated in assembly and expensive in production cost.

According to the first aspect of the present invention, there is provided a surveillance system, comprises: a plurality of imaging units for respectively taking images of specific objects to transform the images into image signals; a plurality of terminal units for respectively displaying thereon the images and producing command signals each indicative of requiring one of the images to be taken by imaging units; an image signal processing apparatus for processing the image signals transformed by the imaging units and operating the terminal units to have the terminal units display the images from the imaging units with the command signals respectively produced by the terminal units; and the image signal processing apparatus including image signal selecting means for selecting one of the image signals from among the image signals respectively transformed by the imaging units; controlling means for controlling the image signal selecting means to allow the image signals to be sequentially selected by the image signal selecting means; image signal encoding means for encoding the image signals sequentially selected by the image signal selecting means to image data; image data compressing means for compressing the image data encoded by the image signal encoding means into compression data; compression data storing means for storing therein the compression data compressed by the image data compressing means; and transmitting means for transmitting to the terminal units the compression data stored by the compression data storing means with the command signals respectively produced by the terminal units.

The compression data storing means may include a plurality of memory units for respectively storing the compression data therein. The memory units may be respectively operative to assume two different modes including first and second modes, the first mode under which the memory units are respectively controlled by the controlling means to have the memory units store the compression data compressed by the image data compressing means therein based on a predetermined allocation of the memory units for the compression data, and the second mode under which the memory units are respectively controlled by the controlling means to have the memory units output the compression data to the transmitting means with the command signals produced by the terminal units.

The image signal processing apparatus may further comprise compression data recording means for recording therein the compression data to be received by the transmitting means from the compression data storing means. The controlling means may be operative to control the compression data recording means to have the compression data recording means record therein the compression data to be received by the transmitting means from the memory units when the memory units are respectively controlled by the controlling means to have the memory units output the compression data to the transmitting means with the command signals produced by the terminal units with the command signals produced by the terminal units.

The image signal selecting means may be constituted by a plurality of switching circuits each having an input terminal and an output terminal, the switching circuits being respectively operative to receive the image signals from the imaging units through the input terminals, and output the image signals received from the imaging units to the image signal encoding mean through the output terminals. The switching circuits may be respectively operative to assume two different modes including "ON" and "OFF" modes, the "ON" mode under which the input terminal is electrically connected with the output terminal, the "OFF" mode under which the input terminal is not electrically connected with the output terminal, the image signal selecting means being operative to select one of the image signals from among the image signals received from the imaging units under the condition that the switching circuits are respectively controlled by the controlling means to allow one of the switching circuits to be in the "ON" mode.

According to the second aspect of the present invention, there is provided an image signal processing apparatus to be provided between an imaging apparatus for taking images of specific objects to transform the images into image signals, and a terminal apparatus for displaying the images thereon and producing command signals to display thereon at least one of the images to be transformed by the imaging apparatus, comprising: image signal selecting means for selecting one of the image signals from among the image signals respectively transformed by the imaging units; controlling means for controlling the image signal selecting means to allow each of the image signals to be sequentially selected by the image signal selecting means; image signal encoding means for encoding each of the image signals sequentially selected by the image signal selecting means to an image data; image data compressing means for compressing the image data encoded by the image signal encoding means into compression data; compression data storing means for storing therein the compression data compressed by the image data compressing means; transmitting means for transmitting to the terminal units the compression data stored by the image data storing means with the command signals respectively produced by the terminal units.

BRIEF DESCRIPTION OF THE DRAWINGS

The present invention and many of the attendant advantages thereof will be better understood from the following detailed description when considered in connection with the accompanying drawings, wherein.

DESCRIPTION OF THE PREFERRED EMBODIMENTS

The following description will now be directed to the preferred embodiments of the surveillance system according to the present invention with reference to FIGS. 1 to 4.

Figure 1:
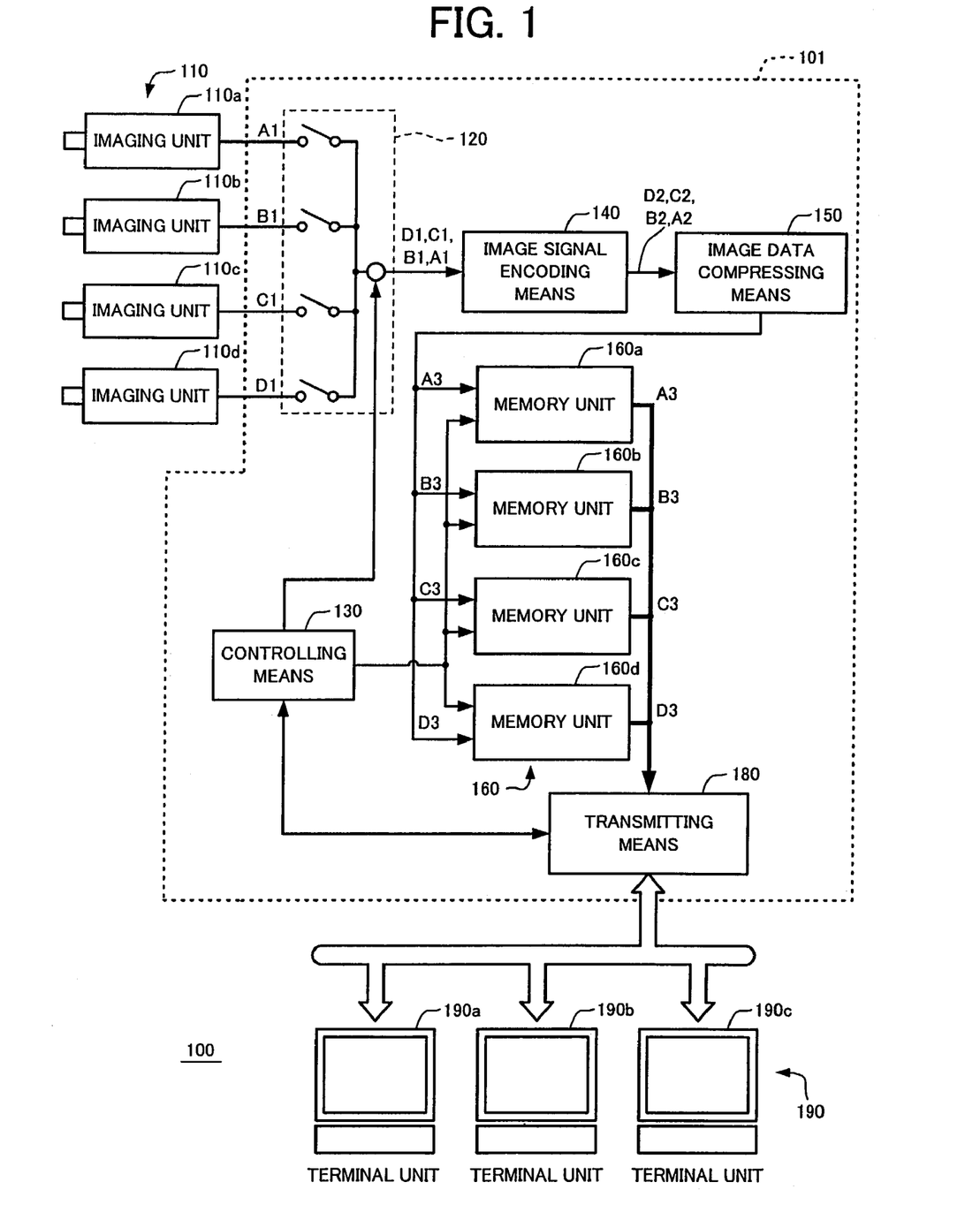
FIG. 1 is a block diagram of the surveillance system according to the first embodiment of the present invention.
Figure 3:
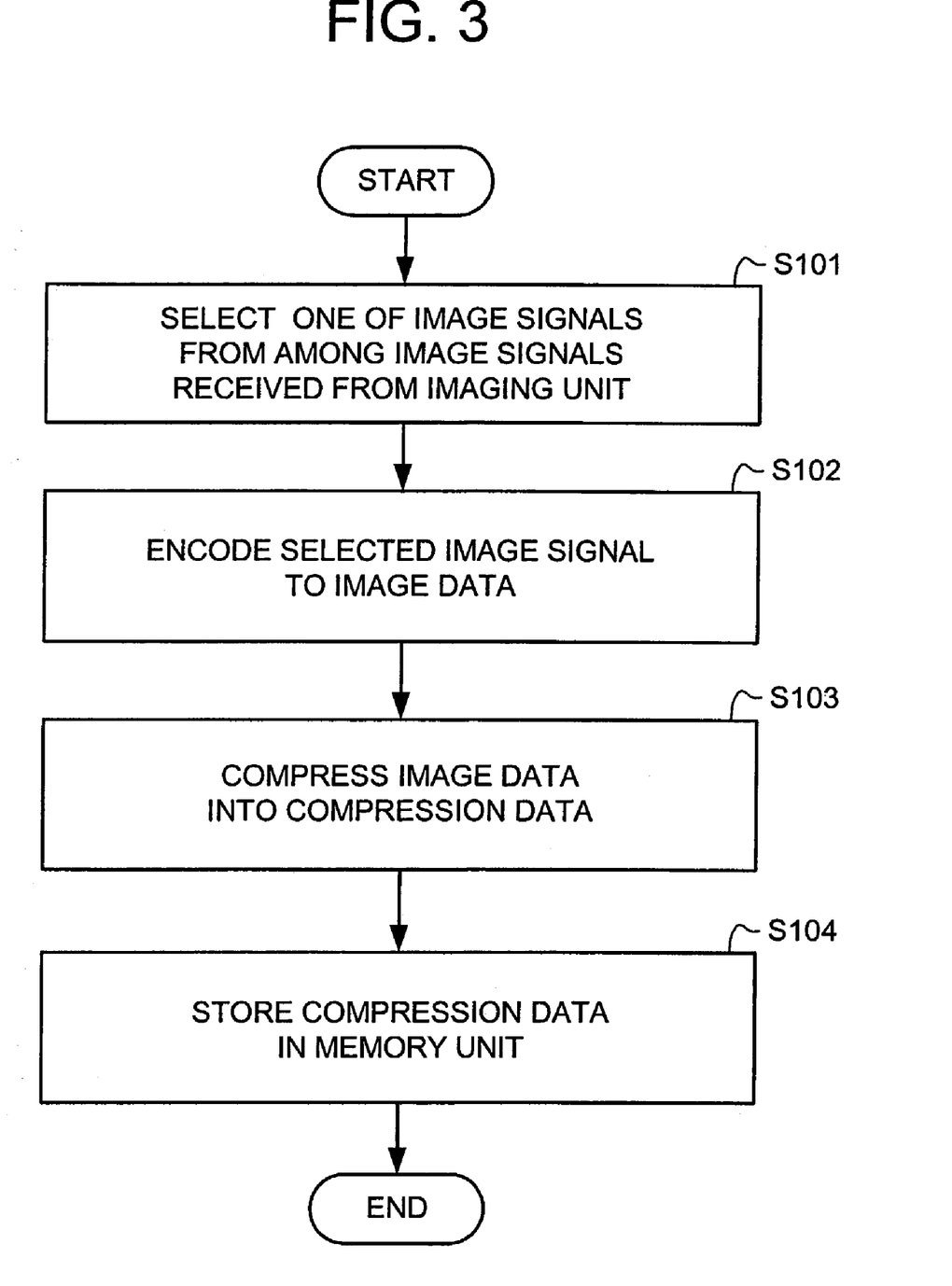
FIG. 3 is a flow chart showing the process performed by the surveillance system according to the first embodiment of the present invention.

The first embodiment of the surveillance system according to the present invention will be described in detail hereinafter with reference to FIGS. 1 and 3.

The surveillance system 100 comprises a plurality of imaging units 110a to 110d for respectively taking images of specific objects to transform the images into image signals "A1", "B1", "C1", and "D1", a plurality of terminal units 190a to 190c for respectively displaying thereon the images and producing command signals each indicative of requiring one of the images to be taken by imaging units 110a to 110d, an image signal processing apparatus 101 for processing the image signals "A1", "B1", "C1", and "D1" transformed by the imaging units 110a to 110d and operating the terminal units 190a to 190c to have the terminal units 190a to 190c display the images from the imaging units 110a to 110d with the command signals respectively produced by the terminal units 190a to 190c.

The image signal processing apparatus 101 includes image signal selecting means 120 for selecting one of the image signals "A1", "B1", "C1", and "D1" from among the image signals "A1", "B1", "C1", and "D1" respectively transformed by the imaging units 110a to 110d, controlling means 130 for controlling the image signal selecting means 120 to allow the image signals "A1", "B1", "C1", and "D1" to be sequentially selected by the image signal selecting means 120, image signal encoding means 140 for encoding the image signals "A1", "B1", "C1", and "D1" sequentially selected by the image signal selecting means 120 to image data "A2", "B2", "C2", and "D2", image data compressing means 150 for compressing the image data "A2", "B2", "C2", and "D2" encoded by the image signal encoding means 140 into compression data "A3", "B3", "C3", and "D3", compression data storing means 160 for storing therein the compression data "A3", "B3", "C3", and "D3" compressed by the image data compressing means 150, and transmitting means 180 for transmitting to the terminal units 190a to 190c the compression data "A3", "B3", "C3", and "D3" stored by the compression data storing means 160 with the command signals respectively produced by the terminal units 190a to 190c.

The compression data storing means 160 includes a plurality of memory units 160a to 160d for respectively storing the compression data "A3", "B3", "C3", and "D3" therein, the memory units 160a to 160d are respectively operative to assume two different modes including first and second modes, the first mode under which the memory units 160a to 160d are respectively controlled by the controlling means 130 to have the memory units 160a to 160d store the compression data "A3", "B3", "C3", and "D3" compressed by the image data compressing means 150 therein based on a predetermined allocation of the memory units 160a to 160d for the compression data "A3", "B3", "C3", and "D3", and the second mode under which the memory units 160a to 160d are respectively controlled by the controlling means 130 to have the memory units 160a to 160d output the compression data "A3", "B3", "C3", and "D3" to the transmitting means 180 with the command signals produced by the terminal units 190a to 190c.

The image signal selecting means 120 is constituted by a plurality of switching circuits each having an input terminal and an output terminal, the switching circuits are respectively operative to receive the image signals "A1", "B1", "C1", and "D1" from the imaging units 110a to 110d through the input terminals, and output the image signals "A1", "B1", "C1", and "D1" received from the imaging units 110a to 110d to the image signal encoding means 140 through the output terminals. The switching circuits are respectively operative to assume two different modes including "ON" and "OFF" modes, the "ON" mode under which the input terminal is electrically connected with the output terminal, and the "OFF" mode under which the input terminal is not electrically connected with the output terminal. The image signal selecting means 120 is operative to select one of the image signals "A1", "B1", "C1", and "D1" from among the image signals "A1", "B1", "C1", and "D1" received from the imaging units 110a to 110d under the condition that the switching circuits are respectively controlled by the controlling means 130 to allow one of the switching circuits to be in the "ON" mode.

The compression data storing means 160 includes a plurality of memory units 160a to 160d for respectively storing the compression data "A3", "B3", "C3", and "D3" therein, however, the compression data storing means 160 may include a memory unit having a plurality of memory areas in which the compression data "A3", "B3", "C3", and "D3" are respectively stored.

The following description will now be directed to the operation of the image signal processing apparatus forming part of the surveillance system according to the first embodiment of the present invention.

The images of the specific objects are respectively taken by the imaging units 110a to 110d, and respectively transformed into the image signals "A1", "B1", "C1", and "D1" by the he imaging units 110a to 110d. The image signal selecting means 120 is firstly controlled by the controlling means 130 to have the image signal selecting means 120 sequentially and repeatedly select the image signals "A1", "B1", "C1", and "D1" from among the image signals "A1", "B1", "C1", and "D1" transformed by the imaging units 110a to 110d, and to have the image signal selecting means 120 sequentially and repeatedly output each of the image signals "A1", "B1", "C1", and "D1" to the image signal encoding means 140 in the step S101.

The image signal "A1", for example, is firstly selected and outputted by the image signal selecting means 120 to the image signal encoding means 140 during a predetermined frame period. The image signal "B1" is then selected and outputted by the image signal selecting means 120 to the image signal encoding means 140 during the predetermined frame period. The image signal "C1" is then selected and outputted by the image signal selecting means 120 to the image signal encoding means 140 during the predetermined frame period. The image signal "D1" is then selected and outputted by the image signal selecting means 120 to the image signal encoding means 140 during the predetermined frame period.

Similarly to the selection of the image signals "A1", "B1", "C1", and "D1" performed by the image signal selecting means 120 as has been mentioned, each of the image signals "A1", "B1", "C1", and "D1" is sequentially and repeatedly selected and outputted by the image signal selecting means 120 to the image signal encoding means 140.

The image signals "A1", "B1", "C1", and "D1" received from the image signal selecting means 120 are sequentially encoded to the image data "A2", "B2", "C2", and "D2" by the image data encoding means 140. The image data "A2", "B2", "C2", and "D2" are then received by the image data compressing means 150 in the step S102.

The image data "A2", "B2", "C2", and "D2" received by the image data compressing means 150 are sequentially compressed into the compression data "A3", "B3", "C3", and "D3" by the image data compressing means 150 in the step S103.

The memory units 160a to 160d are respectively controlled by the controlling means 130 to have the memory units 160a to 160d respectively store therein the compression data "A3", "B3", "C3", and "D3" compressed by the image data compressing means 150 based on the predetermined allocation of the memory units 160a to 160d for the compression data "A3", "B3", "C3", and "D3" in the step S104.

The memory unit 160a, for example, is firstly controlled by the controlling means 130 to have the memory unit 160a receive the compression data "A3", and to have the memory unit 160a store the compression data "A3" therein. The memory unit 160b is then controlled by the controlling means 130 to have the memory unit 160b receive the compression data "B3", and to have the memory unit 160b store the compression data "B3" therein. The memory unit 160c is then controlled by the controlling means 130 to have the memory unit 160c receive the compression data "C3", and to have the memory unit 160c store the compression data "C3" therein. The memory unit 160d is then controlled by the controlling means 130 to have the memory unit 160d receive the compression data "D3", and to have the memory unit 160d store the compression data "D3" therein.

Similarly to the storage of the compression data "A3", "B3", "C3", and "D3" performed by the memory units 160a to 160d as has been mentioned, each of the compression data "A3", "B3", "C3", and "D3" is sequentially and repeatedly stored by the memory units 160a to 160d therein.

When the compression data "A3", "B3", "C3", and "D3" is sequentially and repeatedly stored by the memory units 160a to 160d therein, the compression data "A3", "B3", "C3", and "D3" stored by the memory units 160a to 160d in the previous frames may be respectively updated by storing the compression data "A3", "B3", "C3", and "D3" lastly received from the image data compressing means 150.

The following description will now be directed to the operation of the terminal units 190a to 190c forming part of the surveillance system 100 according to the first embodiment of the present invention.

The command signal indicative of desiring the image taken by the imaging unit 110a is firstly produced by, for example, the terminal unit 190a, and transmitted to the image signal processing apparatus 101 through the network. The command signal from the terminal unit 190a is received by the controlling means 130 forming part of the image signal processing apparatus 101.

The memory unit 160a is then controlled by the controlling means 130 to have the memory unit 160a output the compression data "A3" to the transmitting means 180 with the command signal produced by the terminal unit 190a. The compression data "A3" from the transmitting means 180 is then received by the terminal unit 190a through the network.

The compression data "A3" received from the transmitting means 180 is then decompressed and decoded by the terminal unit 190a. The image indicative of the image signal reproduced from the compression data "A3" is displayed thereon by the terminal unit 190a.

Here, each of the image signals "A1", "B1", "C1", and "D1" has a plurality of frames each having a predetermined frame period. Each of the image data "A2", "B2", "C2", and "D2" is of the frames. The image signals "A1", "B1", "C1", and "D1" of are encoded by the image signal encoding means 140 to the image data "A2", "B2", "C2", and "D2" in the predetermined frame period.

From the above detail description of the first embodiment, it will be understood that the terminal units 190a to 190c can require two or more different images from among the images taken by the imaging units 110a to 110d, and simultaneously display thereon the two or more different images taken by the imaging units 110a to 110d.

Figure 2:
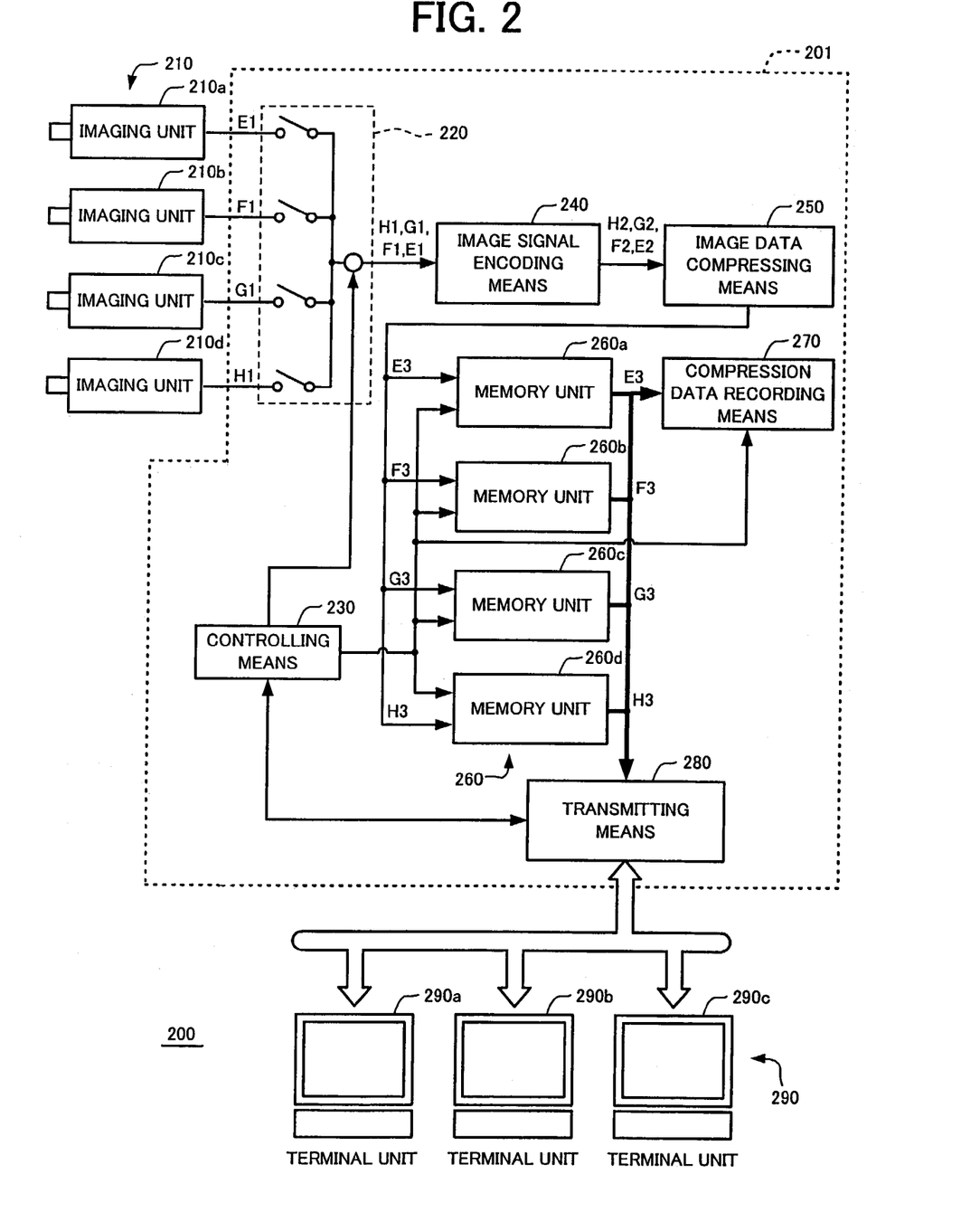
FIG. 2 is a block diagram of the surveillance system according to the second embodiment of the present invention.
Figure 4:
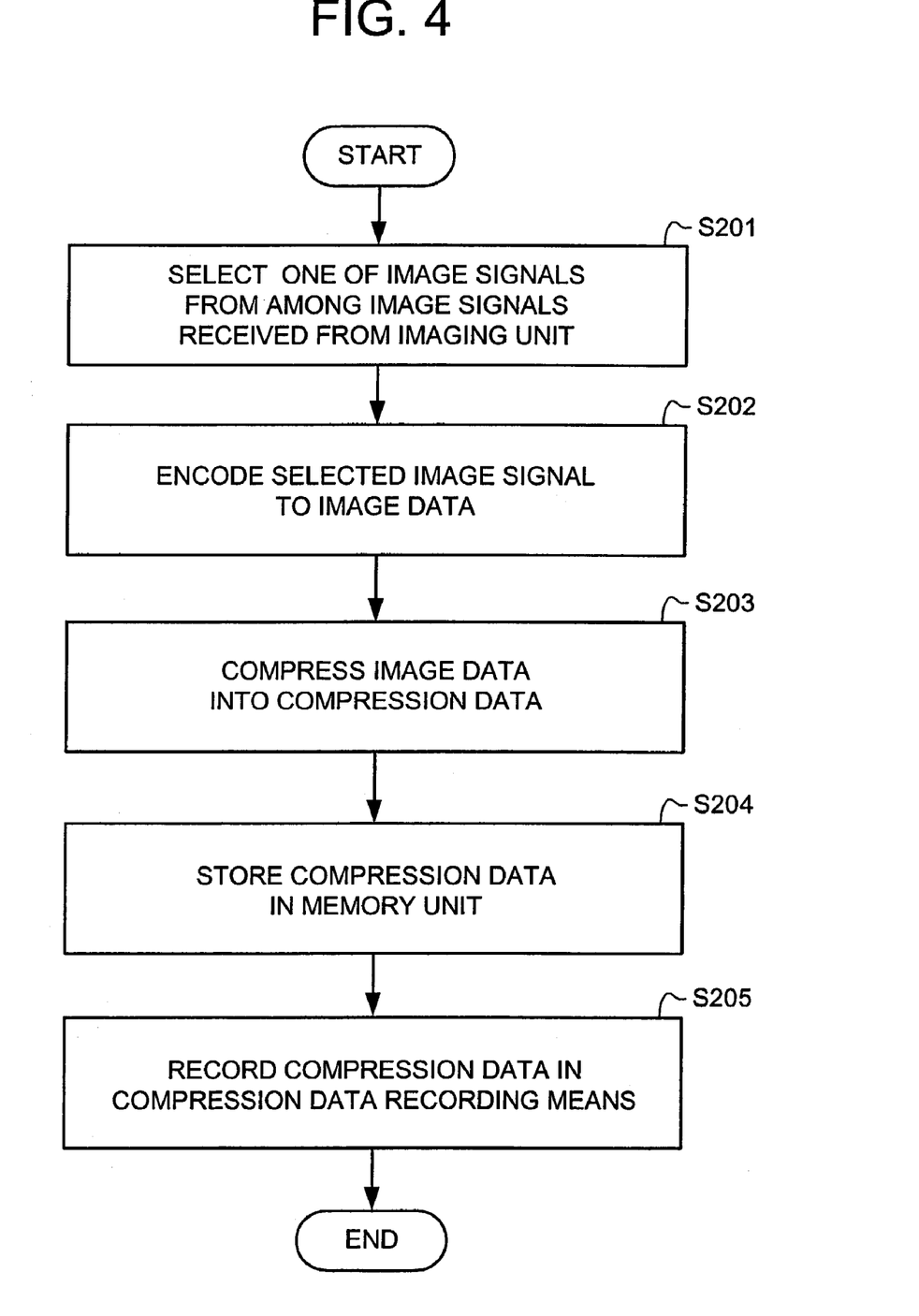
FIG. 4 is a flow chart showing the process performed by the surveillance system according to the second embodiment of the present invention.

The second embodiment of the surveillance system according to the present invention will be described in detail hereinafter with reference to FIGS. 2 and 4.

The surveillance system 200 comprises a plurality of imaging units 210a to 210d for respectively taking images of specific objects to transform the images into image signals "E1", "F1", "G1", and "H1", a plurality of terminal units 290a to 290c for respectively displaying thereon the images and producing command signals each indicative of requiring one of the images to be taken by imaging units 210a to 210d, an image signal processing apparatus 201 for processing the image signals "E1", "F1", "G1", and "H1" transformed by the imaging units 210a to 210d and operating the terminal units 290a to 290c to have the terminal units 290a to 290c display the images from the imaging units 210a to 210d with the command signals respectively produced by the terminal units 290a to 290c.

The image signal processing apparatus 201 includes image signal selecting means 220 for selecting one of the image signals "E1", "F1", "G1", and "H1" from among the image signals "E1", "F1", "G1", and "H1" respectively transformed by the imaging units 210a to 210d, controlling means 230 for controlling the image signal selecting means 220 to allow the image signals "E1", "F1", "G1", and "H1" to be sequentially selected by the image signal selecting means 220, image signal encoding means 240 for encoding the image signals "E1", "F1", "G1", and "H1" sequentially selected by the image signal selecting means 220 to image data "E2", "F2", "G2", and "H2", image data compressing means 250 for compressing the image data "E2", "F2", "G2", and "H2" encoded by the image signal encoding means 240 into compression data "E3", "F3", "G3", and "H3", compression data storing means 260 for storing therein the compression data "E3", "F3", "G3", and "H3" compressed by the image data compressing means 250, and transmitting means 280 for transmitting to the terminal units 290a to 290c the compression data "E3", "F3", "G3", and "H3" stored by the compression data storing means 260 with the command signals respectively produced by the terminal units 290a to 290c.

The compression data storing means 260 includes a plurality of memory units 260a to 260d for respectively storing the compression data "E3", "F3", "G3", and "H3" therein, the memory units 260a to 260d are respectively operative to assume two different modes including first and second modes, the first mode under which the memory units 260a to 260d are respectively controlled by the controlling means 230 to have the memory units 260a to 260d store the compression data "E3", "F3", "G3", and "H3" compressed by the image data compressing means 250 therein based on a predetermined allocation of the memory units 260a to 260d for the compression data "E3", "F3", "G3", and "H3", and the second mode under which the memory units 260a to 260d are respectively controlled by the controlling means 230 to have the memory units 260a to 260d output the compression data "E3", "F3", "G3", and "H3" to the transmitting means 280 with the command signals produced by the terminal units 290a to 290c.

The image signal selecting means 220 is constituted by a plurality of switching circuits each having an input terminal and an output terminal, the switching circuits are respectively operative to receive the image signals "E1", "F1", "G1", and "H1" from the imaging units 210a to 210d through the input terminals, and output the image signals "E1", "F1", "G1", and "H1" received from the imaging units 210a to 210d to the image signal encoding means 240 through the output terminals. The switching circuits are respectively operative to assume two different modes including "ON" and "OFF" modes, the "ON" mode under which the input terminal is electrically connected with the output terminal, and the "OFF" mode under which the input terminal is not electrically connected with the output terminal. The image signal selecting means 220 is operative to select one of the image signals "E1", "F1", "G1", and "H1" from among the image signals "E1", "F1", "G1", and "H1" received from the imaging units 210*a* to 210*d* under the condition that the switching circuits are respectively controlled by the controlling means 230 to allow one of the switching circuits to be in the "ON" mode.

The compression data storing means 260 includes a plurality of memory units 260*a* to 260*d* for respectively storing the compression data "E3", "F3", "G3", and "H3" therein, however, the compression data storing means 260 may include a memory unit having a plurality of memory areas in which the compression data "E3", "F3", "G3", and "H3" are respectively stored.

The surveillance system 200 further comprises compression data recording means 270 for recording therein the compression data "E3", "F3", "G3", and "H3" to be received by the transmitting means 280 from the compression data storing means (260), and in which the controlling means 230 is operative to control the compression data recording means 270 to have the compression data recording means 270 record therein the compression data "E3", "F3", "G3", and "H3" to be received by the transmitting means 280 from the memory units 260*a* to 260*d* when the memory units 260*a* to 260*d* are respectively controlled by the controlling means 230 to have the memory units 260*a* to 260*d* output the compression data "E3", "F3", "G3", and "H3" to the transmitting means 280 with the command signals produced by the terminal units 290*a* to 290*c*.

The following description will now be directed to the operation of the surveillance system according to the second embodiment of the present invention.

The following description will now be directed to the operation of the image signal processing apparatus forming part of the surveillance system according to the first embodiment of the present invention.

The images of the specific objects are respectively taken by the imaging units 210*a* to 210*d*, and respectively transformed into the image signals "E1", "F1", "G1", and "H1" by the he imaging units 210*a* to 210*d*. The image signal selecting means 220 is firstly controlled by the controlling means 230 to have the image signal selecting means 220 sequentially and repeatedly select the image signals "E1", "F1", "G1", and "H1" from among the image signals "E1", "F1", "G1", and "H1" transformed by the imaging units 210*a* to 210*d*, and to have the image signal selecting means 220 sequentially and repeatedly output each of the image signals "E1", "F1", "G1", and "H1" to the image signal encoding means 240 in the step S201.

The image signal "E1", for example, is firstly selected and outputted by the image signal selecting means 220 to the image signal encoding means 240 during a predetermined frame period. The image signal "F1" is then selected and outputted by the image signal selecting means 220 to the image signal encoding means 240 during the predetermined frame period. The image signal "G1" is then selected and outputted by the image signal selecting means 220 to the image signal encoding means 240 during the predetermined frame period. The image signal "H1" is then selected and outputted by the image signal selecting means 220 to the image signal encoding means 240 during the predetermined frame period. The image signal "E1"

Similarly to the selection of the image signals "E1", "F1", "G1", and "H1" performed by the image signal selecting means 220 as has been mentioned, each of the image signals "E1", "F1", "G1", and "H1" is sequentially and repeatedly selected and outputted by the image signal selecting means 220 to the image signal encoding means 240.

The image signals "E1", "F1", "G1", and "H1" received from the image signal selecting means 220 are sequentially encoded to the image data "E2", "F2", "G2", and "H2" by the image data encoding means 240. The image data "E2", "F2", "G2", and "H2" are then received by the image data compressing means 250 in the step S202.

The image data "E2", "F2", "G2", and "H2" received by the image data compressing means 250 are sequentially compressed into the compression data "E3", "F3", "G3", and "H3" by the image data compressing means 250 in the step S203.

The memory units 260*a* to 260*d* are respectively controlled by the controlling means 230 to have the memory units 260*a* to 260*d* respectively store therein the compression data "E3", "F3", "G3", and "H3" compressed by the image data compressing means 250 based on the predetermined allocation of the memory units 260*a* to 260*d* for the compression data "E3", "F3", "G3", and "H3" in the step S204.

The memory unit 260*a*, for example, is firstly controlled by the controlling means 230 to have the memory unit 260*a* receive the compression data "E3", and to have the memory unit 260*a* store the compression data "E3" therein. The memory unit 260*b* is then controlled by the controlling means 230 to have the memory unit 260*b* receive the compression data "F3", and to have the memory unit 260*b* store the compression data "F3" therein. The memory unit 260*c* is then controlled by the controlling means 230 to have the memory unit 260*c* receive the compression data "G3", and to have the memory unit 260*c* store the compression data "G3" therein. The memory unit 260*d* is then controlled by the controlling means 230 to have the memory unit 260*d* receive the compression data "H3", and to have the memory unit 260*d* store the compression data "H3" therein.

Similarly to the storage of the compression data "E3", "F3", "G3", and "H3" performed by the memory units 260*a* to 260*d* as has been mentioned, each of the compression data "E3", "F3", "G3", and "H3" is sequentially and repeatedly store by the memory units 260*a* to 260*d* therein.

When the compression data "E3", "F3", "G3", and "H3" is sequentially and repeatedly store by the memory units 260*a* to 260*d* therein, the compression data "E3", "F3", "G3", and "H3" stored by the memory units 260*a* to 260*d* in the previous frames may be respectively updated by storing the compression data "E3", "F3", "G3", and "H3" lastly received from the image data compressing means 250.

When the memory units 260*a* to 260*d* are, on the other hand, respectively controlled by the controlling means 230 to have the memory units 260*a* to 260*d* output the compression data "E3", "F3", "G3", and "H3" to the transmitting means 280 with the command signals produced by the terminal units 290*a* to 290*c*, the compression data recording means 270 is controlled by the controlling means 230 to have the compression data recording means 270 record therein the compression data "E3", "F3", "G3", and "H3" to be received by the transmitting means 280 from the memory units 260*a* to 260*d*.

When the command signal indicative of requiring the image of the specific object taken by the imaging unit 210*a* is, for example, received by the controlling means 230 through the transmitting means 280 from the terminal unit 290a, the memory unit 260a is controlled by the controlling means 230 to have the memory unit 260a output the compression data "E3" in association with the image of the specific object taken by the imaging unit 210a to the transmitting means 280 through the compression data recording means 270. The compression data recording means 270 is controlled by the controlling means 230 to have the compression data recording means 270 record the compression data "E3" received from the memory unit 260a therein. The transmitting means 280 is controlled by the controlling means 230 to have the transmitting means 280 transmit the compression data "E3" received from the memory unit 260a to the terminal unit 290a in the step 205.

When the command signal indicative of requiring the image of the specific object taken by the imaging unit 210b is, on the other hand, received by the controlling means 230 through the transmitting means 280 from the terminal unit 290b, the memory unit 260b is controlled by the controlling means 230 to have the memory unit 260b output the compression data "F3" in association with the image of the specific object taken by the imaging unit 210b to the transmitting means 280 through the compression data recording means 270. The compression data recording means 270 is controlled by the controlling means 230 to have the compression data recording means 270 record the compression data "F3" received from the memory unit 260b therein. The transmitting means 280 is controlled by the controlling means 230 to have the transmitting means 280 transmit the compression data "F3" received from the memory unit 260b to the terminal unit 290b.

From the above detail description of the second embodiment, it will be understood that the terminal units 290a to 290c can simultaneously require two or more different images from among the images taken by the imaging units 210a to 210d, and cannot simultaneously display on thereon the two or more different images.

The following description will now be directed to the operation of the terminal units 290a to 290c forming part of the surveillance system 200 according to the first embodiment of the present invention.

The command signal indicative of desiring the image taken by the imaging unit 210a is firstly produced by, for example, the terminal unit 290a, and transmitted to the image signal processing apparatus 201 through the network. The command signal from the terminal unit 290a is received by the controlling means 230 forming part of the image signal processing apparatus 201.

The memory unit 260a is then controlled by the controlling means 230 to have the memory unit 260a output the compression data "E3" to the transmitting means 280 with the command signal produced by the terminal unit 290a. The compression data "E3" from the transmitting means 280 is then received by the terminal unit 290a through the network.

The compression data "E3" received from the transmitting means 280 is then decompressed and decoded by the terminal unit 290a. The image indicative of the image signal reproduced from the compression data "E3" is displayed thereon by the terminal unit 290a.

Here, each of the image signals "E1", "F1", "G1", and "H1" has a plurality of frames each having a predetermined frame period. Each of the image data "E2", "F2", "G2", and "H2" is of the frames. The image signals "E1", "F1", "G1", and "H1" of are encoded by the image signal encoding means 240 to the image data "E2", "F2", "G2", and "H2" in the predetermined frame period.

From the above detail description of the second embodiment, it will be understood that the terminal units forming part of the surveillance system can require two or more different images from among the images taken by the imaging units, and simultaneously display on thereon the two or more different images taken by the imaging units, the compression data recording means can record the compression data with respect to the image respectively required by the terminal units.

As will be seen from the above description, the surveillance system according to the present invention can enhance the quality of the surveillance with respect to the specific objects to be taken by the imaging units by simultaneously monitoring two or more different specific objects by an operator or operators through the images of the specific objects respectively displayed on the monitors without being complicated in assembly and expensive in production cost.

While the subject invention has been described with relation to the preferred embodiments, various modifications and adaptations thereof will now be apparent to those skilled in the art as far as such modifications and adaptations fall within the scope of the appended claims intended to be covered thereby.

What is claimed is:

1. A surveillance system, comprising:

a plurality of imaging units for respectively taking images of specific objects to transform said images into image signals;

a plurality of terminal units for selectively displaying thereon said images by producing command signals each indicative of requiring said imaging units to take one of said images; and an image signal processing apparatus for processing said image signals transformed by said imaging units in response to said command signals respectively produced by said terminal units, said image signal processing apparatus including:

image signal selecting means for selecting one of said image signals from among said image signals respectively transformed by said imaging units;

controlling means for controlling said image signal selecting means to allow each of said image signals to be sequentially selected by said image signal selecting means;

image signal encoding means for encoding each of said image signals sequentially selected by said image signal selecting means to image data;

image data compressing means for compressing said image data encoded by said image signal encoding means into compression data;

compression data storing means for storing therein said compression data compressed by said image data compressing means;

transmitting means for transmitting to said terminal units said compression data stored by said compression data storing means in response to said command signals respectively produced by said terminal units; and compression data recording means for recording therein said compression data received by said transmitting means from said compression data storing means, wherein said compression data storing means includes a plurality of memory units allocated to said respective imaging units, said controlling means is adapted to control said memory units to have said memory units store said compression data compressed by said image data compressing means based on the allocation of said memory unit, said controlling means is adapted to control said memory units to have said memory units output said compression data to said transmitting means in response to said command signals respectively produced by said terminal units, and said controlling means is adapted to control said compression data recording means to have said compression data recording means record therein said compression data received by said transmitting means from said memory units.

2. A surveillance system as set forth in claim 1, in which said image signal selecting means is constituted by a plurality of switching circuits each having an input terminal and an output terminal; said switching circuits are respectively operative to receive said image signals from said imaging units through said input terminals, and output said image signals received from said imaging units to said image signal encoding means through said output terminals; said switching circuits are respectively operative to assume two different modes including "ON" and "OFF" modes, said "ON" mode under which said input terminal is electrically connected with said output terminal, and said "OFF" mode under which said input terminal is not electrically connected with said output terminal; and said image signal selecting means is operative to select one of said image signals from among said image signals received from said imaging units under the condition that said switching circuits are respectively controlled by said controlling means to allow one of said switching circuits to be in said "ON" mode.

3. An image signal processing apparatus to be provided between an imaging apparatus and a terminal apparatus, said imaging apparatus having a plurality of imaging units for taking images of specific objects to transform said images into image signals, and said terminal apparatus having a plurality of terminal units for selectively displaying said images thereon and producing command signals each indicative of requiring said imaging units to take one of said images, said imaging signal processing apparatus comprising:

image signal selecting means for selecting one of said image signals from among said image signals respectively transformed by said imaging units;

controlling means for controlling said image signal selecting means to allow each of said image signals to be sequentially selected by said image signal selecting means;

image signal encoding means for encoding each of said image signals sequentially selected by said image signal selecting means to image data;

image data compressing means for compressing said image data encoded by said image signal encoding means into compression data;

compression data storing means for storing therein said compression data compressed by said image data compressing means;

transmitting means for transmitting to said terminal units said compression data stored by said compression data storing means in response to said command signals respectively produced by said terminal units; and compression data recording means for recording therein said compression data received by said transmitting means from said compression data storing means, wherein said compression data storing means includes a plurality of memory units allocated to said respective imaging units;

said controlling means is adapted to control said memory units to have said memory units store said compression data compressed by said image data compressing means based on the allocation of said memory unit;

said controlling means is adapted to control said memory units to have said memory units output said compression data to said transmitting means in response to said command signals respectively produced by said terminal units; and said controlling means is adapted to control said compression data recording means to have said compression data recording means record therein said compression data received by said transmitting means from said memory units.

4. An image signal processing apparatus as set forth in claim 3, in which said image signal selecting means is constituted by a plurality of switching circuits each having an input terminal and an output terminal; said switching circuits are respectively operative to receive said image signals from said imaging units through said input terminals, and output said image signals received from said imaging units to said image signal encoding means through said output terminals; said switching circuits are respectively operative to assume two different modes including "ON" and "OFF" modes, said "ON" mode under which said input terminal is electrically connected with said output terminal, and said "OFF" mode under which said input terminal is not electrically connected with said output terminal; and said image signal selecting means is operative to select one of said image signals from among said image signals received from said imaging units under the condition that said switching circuits are respectively controlled by said controlling means to allow one of said switching circuits to be in said "ON" mode.

* * * * *